US007370809B2

(12) United States Patent
Gougeon

(10) Patent No.: US 7,370,809 B2
(45) Date of Patent: May 13, 2008

(54) MONOCOQUE LENTICULAR PLASTIC CARD AND METHOD OF MAKING SAME

(75) Inventor: Pierre Gougeon, Rosmère (CA)

(73) Assignee: Technologies Photogram Inc., Lachenaie (CA)

(*) Notice: Subject to any disclaimer, the term of this patent is extended or adjusted under 35 U.S.C. 154(b) by 335 days.

(21) Appl. No.: 11/172,867

(22) Filed: Jul. 5, 2005

(65) Prior Publication Data

US 2006/0151612 A1 Jul. 13, 2006

Related U.S. Application Data

(60) Provisional application No. 60/585,095, filed on Jul. 6, 2004.

(51) Int. Cl.
*G06K 19/05* (2006.01)

(52) U.S. Cl. ...................................... 235/492; 235/487

(58) Field of Classification Search ................ 235/487, 235/492, 488; 156/277; 359/463, 619
See application file for complete search history.

(56) References Cited

U.S. PATENT DOCUMENTS

| | | | | |
|---|---|---|---|---|
| 4,869,946 | A * | 9/1989 | Clay | 428/167 |
| 6,016,225 | A * | 1/2000 | Anderson | 359/619 |
| 6,277,232 | B1 * | 8/2001 | Wang et al. | 156/250 |
| 6,758,936 | B1 * | 7/2004 | Kiekhaefer et al. | 156/277 |
| 6,817,530 | B2 * | 11/2004 | Labrec et al. | 235/487 |
| 6,900,944 | B2 | 5/2005 | Tomczyk | |
| 7,075,725 | B2 | 7/2006 | Tomczyk | |

* cited by examiner

*Primary Examiner*—Daniel Stcyr
(74) *Attorney, Agent, or Firm*—Beboît & Co.

(57) ABSTRACT

A monocoque card for performing transactions is disclosed. The card comprises a substrate having a lenticular portion on a front side and a flat portion on a back side. The substrate has a thickness between 28 and 34 thousandths of an inch. Inks are applied on the flat portion on the back side and an information bearing portion is applied over the inks and for use in performing the transactions. A method for making such a monocoque card is also disclosed.

19 Claims, 2 Drawing Sheets

MONOCOQUE LENTICULAR PLASTIC CARD AND METHOD OF MAKING SAME

CROSS-REFERENCE TO RELATED APPLICATIONS

This application claims priority under 35USC§119(e) of U.S. provisional patent application 60/585,095, that was filed on Jul. 6, 2004, entitled "Monocoque lenticular plastic card and method of making the same", the specification of which is hereby incorporated by reference. This application further claims priority of Canadian patent application N°2, 472,996, filed Jul. 5, 2004 and entitled "Monocoque lenticular plastic card and method of making the same", the specification of which is hereby incorporated by reference.

TECHNICAL FIELD

This invention pertains to the field of lenticular cards.

BACKGROUND OF THE INVENTION

Various techniques have been disclosed for creating a lenticular card. For instance, Tomczyk discloses in U.S. Pat. No. 6,900,944 a lenticular card and processes for making the same.

Unfortunately, such techniques have many drawbacks which the invention disclosed herein aims to resolve.

SUMMARY OF THE INVENTION

According to one aspect of the invention, there is provided a monocoque card for information exchange comprising a substrate having a lenticular portion on a front side and a flat portion on a back side; special effects image inks applied on the flat portion on the back side, the special effects image for viewing through the lenticular portion; a clear primer applied over the special effects image forming inks; an isolation ink layer over the clear primer; and an information bearing portion applied over the isolation ink layer and for use in performing the transactions.

According to another aspect of the invention, there is provided a monocoque card for information exchange comprising a substrate having a lenticular portion on a front side and a flat portion on a back side; the substrate having a thickness between 28 and 34 thousandths of an inch; special effects image forming inks applied on the flat portion on the back side, the special effects image for viewing through the lenticular portion; a clear primer applied over at least one of the inks; an information bearing portion applied over the inks and for use in the information exchange; and the monocoque card being free of any other laminated substrate apart from the inks, the primer and the information bearing portion.

According to yet another aspect of the invention, there is provided a method of making a monocoque card, the method comprising providing a substrate having a lenticular portion on a front side a flat portion on a back side; applying special effects image forming inks on the flat portion on the back side; applying a clear primer over the special effects image forming inks; applying an isolation ink layer over the clear primer; and applying an information bearing portion over the isolation ink layer.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
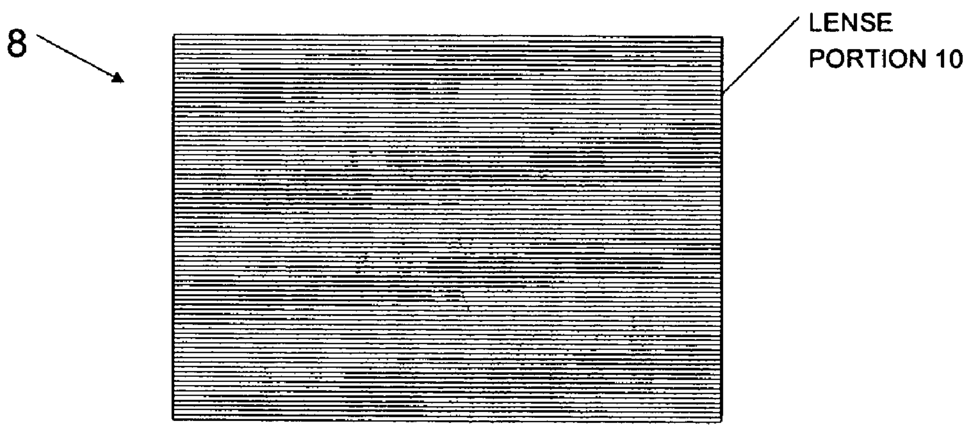
FIG. 1A is schematic diagram showing a front plan view of a monocoque card according to an embodiment of the invention.

Now referring to FIG. 1A, there is shown an embodiment of a monocoque lenticular card 8 viewed from the top or front. The card 8 comprises a lense portion 10 on its front side. In one embodiment, the lense portion 10 is adapted to reveal a special effects image printed on a second side (not shown here, but detailed hereunder).

Figure 1B:
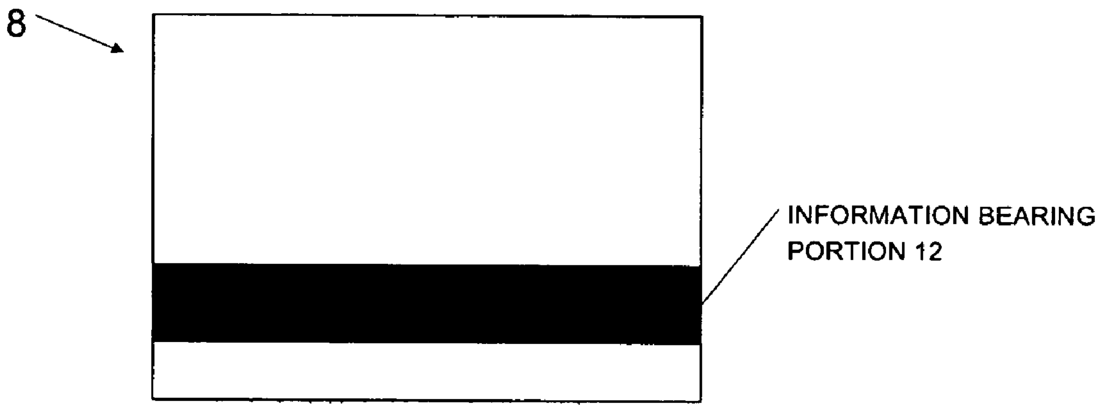
FIG. 1B is schematic diagram showing a back plan view of a monocoque card according to an embodiment of the invention.

Now referring to FIG. 1B, there is shown an embodiment of a monocoque lenticular card 8 viewed from the back or rear. Card 8 further comprises an information bearing portion 12.

It should be appreciated that the information bearing portion 12 may comprise at least one of a magstripe, a barcode, an image, an RFID tag, a computer chip or any other type of information bearing means that may be attached or integrated to card 8. The information bearing portion 12 may comprise identification information as well as data such as, for example, an amount of cash, a token, a finger print, a Personal Identification Number (PIN), etc.

Card 8 can therefore be used for transaction purposes, for gaming, as a marketing tool, etc.

Figure 1C:
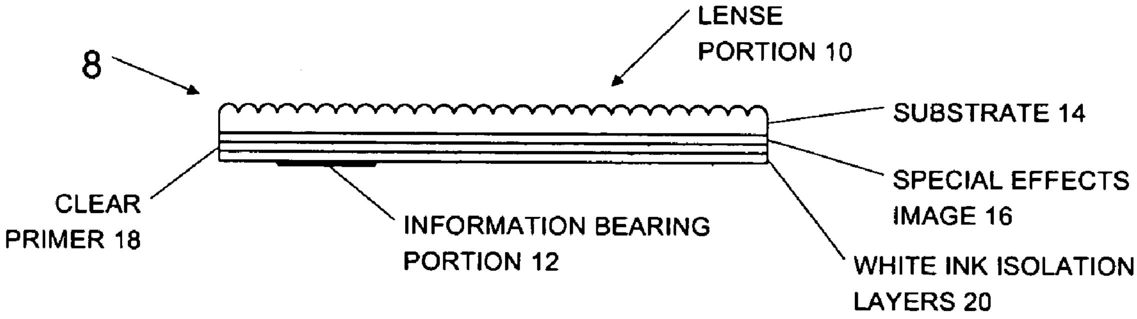
FIG. 1C is schematic diagram showing a side view of a monocoque card according to an embodiment of the invention.

Now referring to FIG. 1C, there is shown an embodiment of a monocoque lenticular card 8 viewed from the side. A substrate 14 is shown having a lense portion 10. Special effects image forming inks 16 are shown on or over the substrate while clear primer 18 is shown on or over inks 16. Then, an ink isolation layer is shown over clear primer 18. Finally, information bearing portion 12 is shown over primer 18. Details concerning the composition and application of each layer of ink or primer are discussed hereinbelow.

Alternatively, the lense portion 10 comprises a lense portion capable of revealing information hidden in a printed material and further capable of revealing an associated image printed on its back side.

Figure 2:
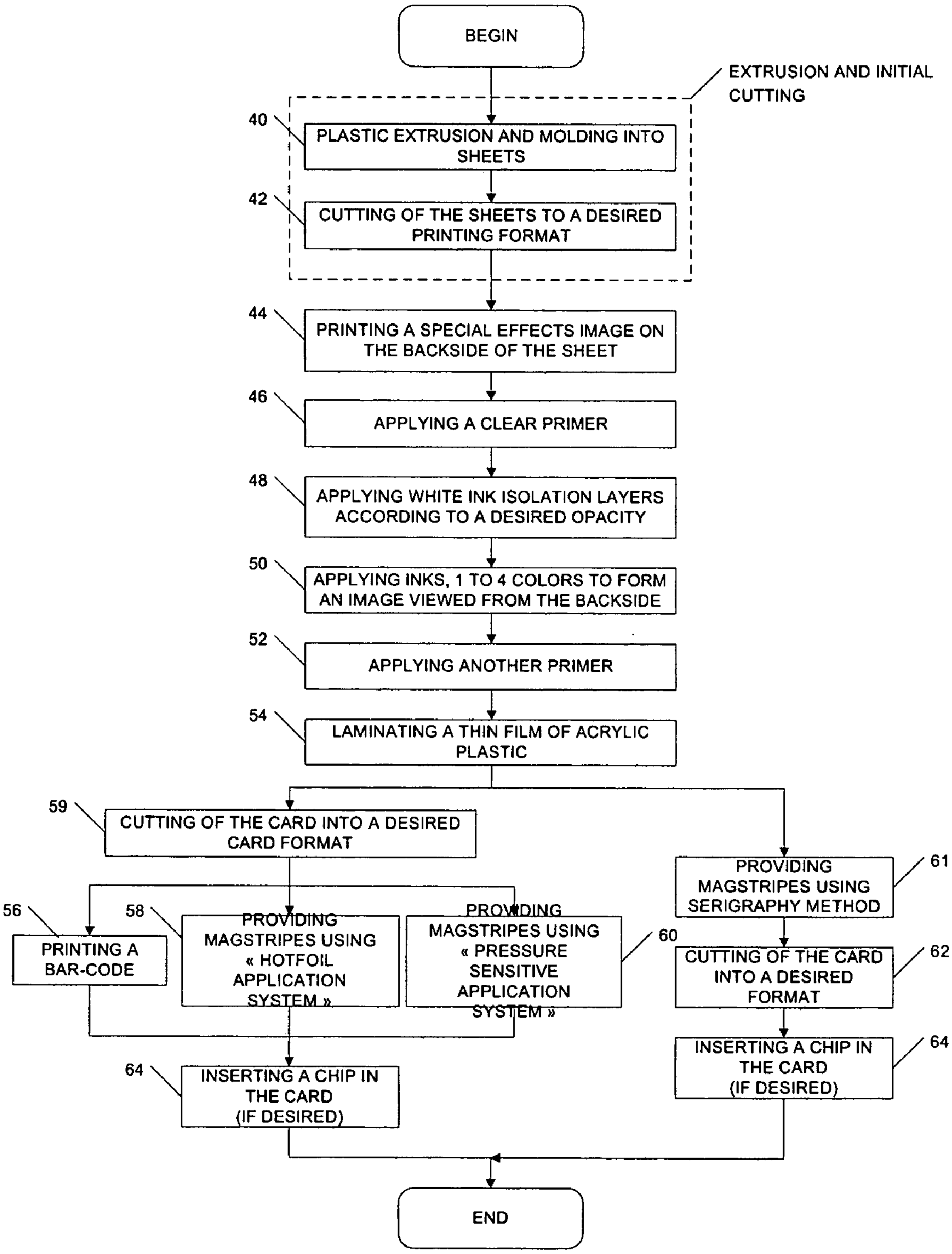
FIG. 2 is a flowchart showing how the card is manufactured according to an embodiment.

Now referring to FIG. 2, there is shown an embodiment for manufacturing the card 8.

According to step 40, a plastic extrusion and/or a molding into sheets of plastic is performed. This step is performed using at least one of an extrusion cylinder, a special molding and a "stamp die". It will be appreciated that the plastic extrusion and the molding in sheet of plastic is performed to obtain a substrate having a thickness comprised between 28 and 34 mil (thousandths of an inch). The skilled addressee will appreciate that such thickness helps meeting requirements related to the CR 80 format. The skilled addressee will appreciate that the lens portion 10 is created at this point.

According to step 42, the sheets are cut into a desired printing format. It will be appreciated that the sheets may be cut into a wide variety of printing formats depending on the requirements of the machine used for the next steps. It will be appreciated that this step is optional in the case where the sheets are already in the desired printing format.

According to step 44, a printing of a special effects image is performed on the backside of the sheet with conventional, UV, UV hybrid, or vinyl acrylic-based inks using a litho press or silkscreen method. It will be appreciated that a special effects image is printed according to the requirements of the desired application.

According to step 46, a clear primer is applied over the special effects image using a litho press or silk screen method. The clear primer is selected based on its compatibility with the ink forming the special effects image and those of the next step. That is, it is either of water-based for conventional inks, UV compatible for UV or hybrid inks, or a vinyl acrylic primer for vinyl acrylic-based inks.

According to step 48, an isolation ink layer is provided using a litho press or silkscreen method. The isolation ink layer provides a sealing effect for the lenticular special effects image and acts as the isolator from the subsequent printing steps. Normally, the isolation ink layer is white ink and more than one layer is applied according to a desired opacity. It will be appreciated that 4, 6, 8 or more layers may be provided. The isolation ink layer is selected based at least on its compatibility with the ink forming the special effects image and/or the clear primer. That is, it is either of conventional, UV, UV hybrid, or vinyl acrylic-based.

According to step 50, UV inks are printed, 1 to 4 colors using a litho press or silkscreen method. According to step 52, another primer is applied using a litho press or silkscreen method. The inks and primer in steps 50 and 52 are selected in the manner explained earlier for other inks and primer.

Suppliers of primers and inks discussed herein include Sun Chemical Corp.

According to step 54, a thin film of acrylic plastic is laminated. It will be appreciated that this step is optional. In one embodiment, the thin film has a thickness of approximately 2-3 millimeters. It will be further appreciated that in one embodiment, the thin film is laminated using dispersion water based adhesives (self cross-linking polymer emulsion) by nipping the lenticular plastic sheet and the thin acrylic film with a nip roller. In one embodiment, the dispersion adhesive may be provided by Jowat Inc.

According to step 59, the cards are cut into a desired format such as the CR80 format. It will be appreciated by the skilled addressee that the desired format depends on an application sought.

According to step 56, a barcode is printed. It will be appreciated that the barcode may be printed using various processes such as an inkjet process, a thermajet process and other similar processes.

Alternatively and as shown in step 58, magstripes may be provided using a "hotfoil application system". Alternatively and as shown in step 60, magstripes are provided using "pressure sensitive application system".

According to step 64, a chip may be inserted in the card 8 if desired.

According to step 61, magstripes are provided using a silkscreen method.

According to step 62, the card is cut in a desired card format such as the CR80 format. It will be appreciated by the skilled addressee that the desired format depends on an application sought.

Again and as explained above, a chip may be inserted in the card 8 if desired according to step 64.

The embodiments of the invention described above are intended to be exemplary only. The scope of the invention is therefore intended to be limited solely by the scope of the appended claims.

I claim:

1. A monocoque card for information exchange comprising:

a substrate having a lenticular portion on a front side and a flat portion on a back side;

special effects image inks applied on said flat portion on said back side, said special effects image inks forming a special effects image for viewing through said lenticular portion;

a clear primer applied over said special effects image forming inks;

an isolation ink layer over said clear primer; and an information bearing portion applied over said isolation ink layer and for use in performing said transactions.

2. The monocoque card of claim 1, further comprising a layer of dispersion water based adhesive applied over said isolation ink layer, and a film of acrylic plastic applied over said layer of dispersion water based adhesive.

3. The monocoque card of claim 2, wherein said dispersion water based adhesive comprises a self cross-linking polymer emulsion.

4. The monocoque card of claim 3, wherein said information bearing portion comprises at least one of an inkjet applied barcode, a thermajet applied barcode, a holfoil applied magstripe, a pressure sensitive applied magstripe, a silkscreen applied magstripe, a printed image, an RFID tag, and a computer chip.

5. The monocoque card of claim 1, wherein said information bearing portion comprises at least one of an inkjet applied barcode, a thermajet applied barcode, a hotfoil applied magstripe, a pressure sensitive applied magstripe, a silkscreen applied magstripe, a printed image, an RFID tag, and a computer chip.

6. The monocoque card of claim 1, wherein said special effects image inks comprise conventional inks, UV or UV hybrid inks, and vinyl acrylic-based inks.

7. The monocoque card of claim 6, wherein said clear primer is compatible with the corresponding special effects image inks, and comprises at least one of: a water-based primer for special effects image inks which comprise conventional inks, a UV compatible primer for special effects image inks which comprise one of UV and hybrid inks, and a vinyl acrylic primer for special effects image inks which comprise vinyl acrylic-based inks.

8. The monocoque card of claim 7, wherein the isolation ink layer is selected based at least on its compatibility with at least one of the special effects image inks and the clear primer, and comprises one of a conventional, a UV, a UV hybrid, and a vinyl acrylic-based ink.

9. The monocoque card of claim 8, further comprising another primer applied over the isolation ink layer and wherein said information bearing portion is applied over said another primer.

10. A monocoque card for information exchange comprising:

a substrate having a lenticular portion on a front side and a flat portion on a back side;

said substrate having a thickness between 28 and 34 thousandths of an inch;

special effects image forming inks applied on said flat portion on said back side, said special effects image inks forming a special effects image for viewing through said lenticular portion;

a clear primer applied over at least one of said inks;

an information bearing portion applied over said inks and for use in said information exchange; and said monocoque card being free of any other laminated substrate apart from said inks, said primer and said information bearing portion.

11. A method of making a monocoque card, said method comprising:

providing a substrate having a lenticular portion on a front side and a flat portion on a back side;

applying special effects image forming inks on said flat portion on said back side;

applying a clear primer over said special effects image forming inks;

applying an isolation ink over said clear primer; and applying an information bearing portion over said isolation ink layer.

12. The method of claim 11, further comprising applying a layer of dispersion water based adhesive over said inks and applying a film of acrylic plastic over said layer of dispersion water based adhesive, wherein said information bearing portion is thereby applied over said film of acrylic plastic.

13. The method of claim 12, wherein said dispersion water based adhesive comprises a self cross-linking polymer emulsion.

14. The method of claim 13, wherein applying said information bearing portion comprises at least one of an inkjet applied barcode, a thermajet applied barcode, a hotfoil applied magstripe, a pressure sensitive applied magstripe, a silkscreen applied magstripe, a printed image, an RFID tag, and a computer chip.

15. The method of claim 11, wherein applying said information bearing portion comprises at least one of an inkjet applied barcode, a thermajet applied barcode, a hotfoil applied magstripe, a pressure sensitive applied magstripe, a silkscreen applied magstripe, a printed image, an RFID tag, and a computer chip.

16. The method of claim 11, wherein said providing a substrate comprises extruding said substrate into a sheet having a thickness between 28 and 34 thousandths of an inch.

17. The method of claim 11, wherein said special effects image inks comprise conventional inks, UV or UV hybrid inks, and vinyl acrylic-based inks.

18. The method of claim 17, wherein said clear primer is compatible with the corresponding special effects image inks and comprises at least one of: a water-based primer for special effects image inks which are conventional inks, a UV compatible primer for special effects image inks which are one of UV and hybrid inks, and a vinyl acrylic primer for special effects image inks which are vinyl acrylic-based inks.

19. The method of claim 18, wherein the isolation ink layer is selected based at least on its compatibility with at least one of the special effects image inks and the clear primer, and comprises one of a conventional, a UV, a UV hybrid, and a vinyl acrylic-based ink.

* * * * *